July 28, 1942.  H. O. WILLIAMS  2,291,126
AUTOMATIC GRAIN DUMPING DEVICE FOR WEIGHING SCALES
Filed Aug. 9, 1940   3 Sheets-Sheet 2
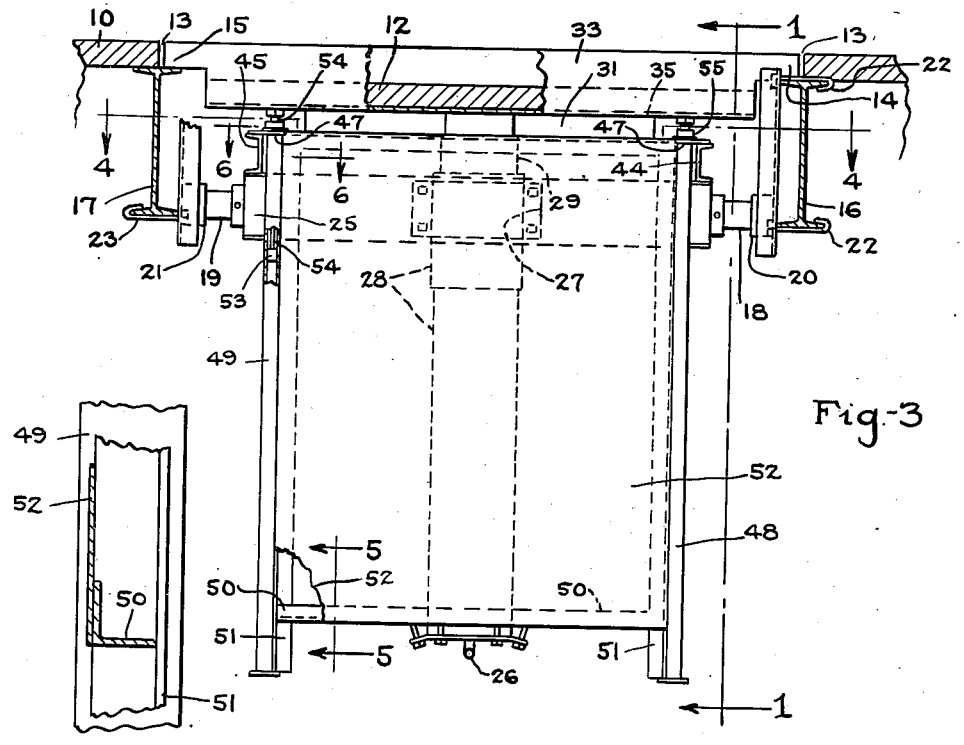
Fig-3
Fig-5
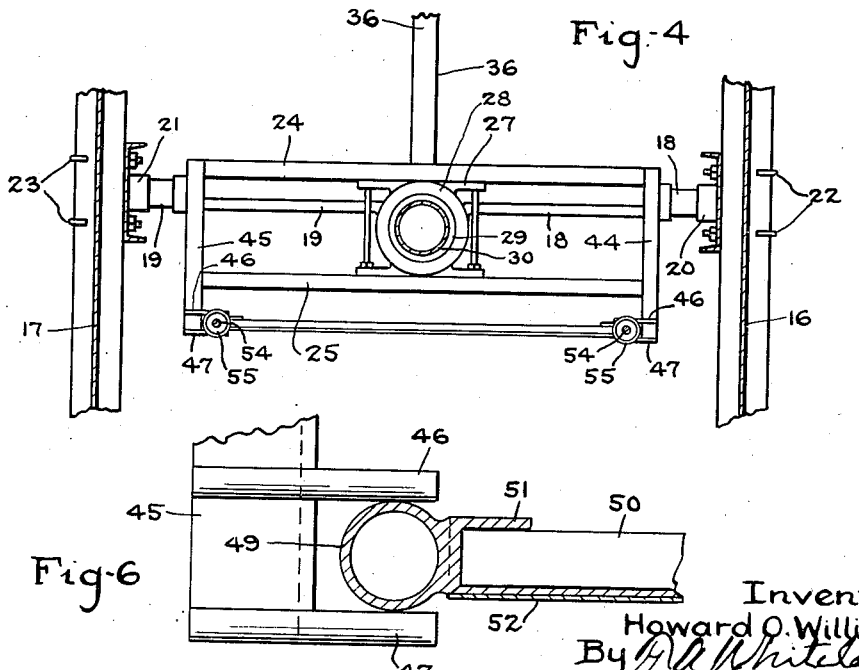
Fig-4
Fig-6
Inventor:
Howard O. Williams
By  Whiteley
Attorney

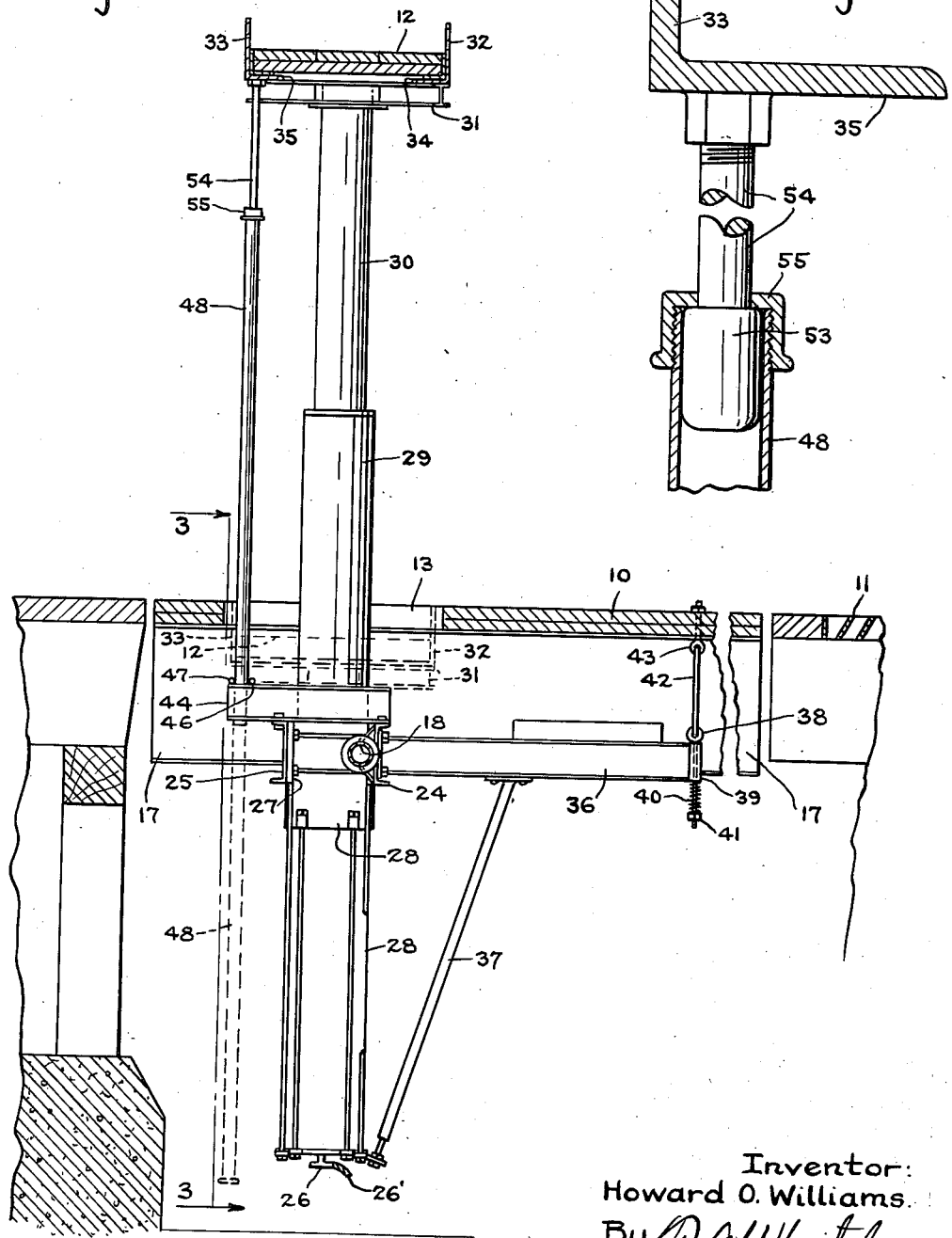

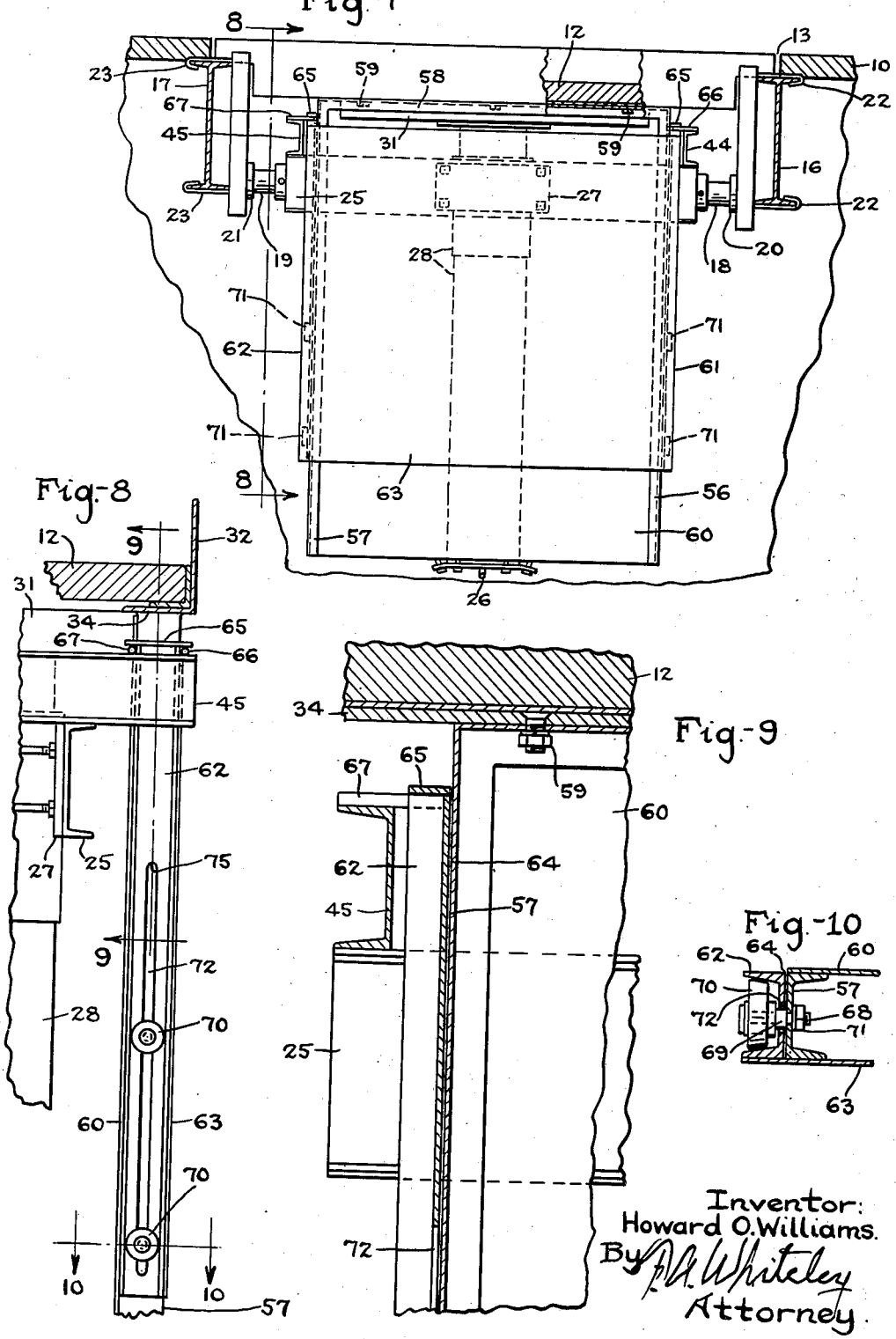

Patented July 28, 1942

2,291,126

UNITED STATES PATENT OFFICE 2,291,126

AUTOMATIC GRAIN DUMPING DEVICE FOR WEIGHING SCALES

Howard O. Williams, Minneapolis, Minn., assignor to R. R. Howell Company, Minneapolis, Minn., a corporation Application August 9, 1940, Serial No. 351,969

7 Claims. (Cl. 214—46.5)

My invention relates to an automatic grain dumping device for weighing scales and has for its object to provide suitable horse guard and steadying means for the hoisting means as it is lifted and lowered.

The devices of the type covered by this invention may embody a movable support normally nested in an opening in the scale platform upon which the front wheels of a vehicle (truck, wagon or the like) loaded with grain may be driven and positioned, together with cylinder and piston means also supported on the scale platform adapted to raise the support to a suitable position so that after weighing has been completed, the grain may be released to flow through proper openings to the grain elevating mechanism.

In general farm practice the grain is usually transported by wagons and drawn upon the scale by horses. The elevating mechanism is close to the rear of the horses who may be disturbed or frightened by it and for that reason may, by kicking or thrashing about, injure the hoisting mechanism and tend to injure themselves.

A principal object of my invention is to provide a collapsible horse guard which rises with the front wheel support and forms a wall between the rear of the horses and the front wheel support.

Another difficulty experienced with this type of apparatus has been that, since it is supported upon a single piston shaft operating in a cylinder, there is a tendency for the movable support to swing around the piston shaft as an axis and twist the front wheels of the wagon or other vehicle being lifted and be out of position at the time of restoration to initial position.

To remedy this difficulty it is an object of my invention to provide in conjunction with the aforesaid horse guard, means for holding the movable support in fixed relation to the scale platform so that it cannot swing or get out of position while the platform is being raised.

In this type of apparatus it has been proposed to so mount the movable support that it will be held in rigid relation to the scale platform and move up at all times vertically. It is, however, desirable for the support for the wheels as it is elevated to swing on an axis toward the front end of the vehicle being lifted to accommodate for the otherwise lengthening radius through the length of the vehicle so that it will not be necessary for the rear wheels of the vehicle to be dragged in a forward direction. To meet this condition it is an object of my invention to provide special means for permitting this swing of the movable support as it is being lifted.

The full objects and advantages of my invention will appear in connection with the detailed description thereof and its novel features by which the above named advantages are obtained are particularly pointed out in the claims.

In the drawings illustrating an application of my invention in one form:

Fig. 1 is a longitudinal sectional elevation view taken along the center of the weighing platform adjacent the lifting cylinder and showing the movable support in elevated position, on line 1—1 of Fig. 3.

Fig. 2 is an enlarged sectional view of parts shown in the upper left hand corner of Fig. 1 showing the telescoping support for the horse guard elevating device.

Fig. 3 is a side elevation view across the weighing platform taken on line 3—3 of Fig. 1, with all of the parts in their depressed position.

Fig. 4 is a part sectional plan view taken on line 4—4 of Fig. 3.

Fig. 5 is a sectional elevation view taken on line 5—5 of Fig. 3.

Fig. 6 is an enlarged sectional plan view taken on line 6—6 of Fig. 3.

Fig. 7 is a front elevation part sectional view of a modified form of the apparatus.

Fig. 8 is a side elevation view taken along line 8—8 of Fig. 7.

Fig. 9 is a vertical sectional fragmentary view taken on line 9—9 of Fig. 8.

Fig. 10 is a sectional plan view taken on line 10—10 of Fig. 8.

In general a scale platform 10 is of usual construction adapted to receive a vehicle driven thereon, either horse drawn wagons, or trucks, where the weight of the whole load may be taken, thereafter the grain dumped passing through a grating 11 to the elevating booth, and the tare weight or the weight of the vehicle taken and in that way the amount of grain delivered be determined. In practice the grain will be contained loose within a wagon box or truck body and will flow by gravity therefrom to the grate 11. To effect this flow rapidly and effectively the front end of the vehicle is raised a sufficient distance to provide enough slope to the wagon box or truck box so that when the rear gate is opened all of the grain will flow by gravity to and through the grating 11.

To obtain the necessary elevation of the front of the vehicle a supplementary platform 12 extends a sufficient distance across the width of the scale platform 10 to receive the front wheels of the vehicle. The supplementary platform 12 normally rests within a recess 13 formed in the scale platform 10 with projecting ends 14 and 15 of the supplementary platform engageable with supporting I-beams 16 and 17.

Means for elevating the supplementary platform 12 is secured to the scale platform in the following manner: Trunnions 18 and 19 are mounted to oscillate in stirrups 20 and 21, Figs. 3 and 7, which are secured to I-beams 16 and 17 by means of sets of stirrup bolts 22 and 23. These trunnions support a framing formed of channel irons 24 and 25 which are secured to a central frame casting 27 supporting an outer cylinder 28 within which operates a hollow tubular piston 29. A second piston 30 operating within the hollow piston 29, air being fed for operating this mechanism to an air valve mechanism 26, Fig. 1, which is fed by a flexible air hose 26'. The trunnion members 18 and 19 are secured at their ends to the cylinder 28. The entire arrangement thus being rigidly united together and being mounted to rock on a pivot formed by the trunnions 18 and 19 which is just at one side of the center line passing through the cylinders 28, 29 and hollow piston 30. The hollow piston 30 is directly attached to a frame system 31, Fig. 1, carrying a pair of side bars 32 and 33 which are formed of angle irons the inner portions 34 and 35 of which are adapted to engage the supplementary platform 12 whereby the same may be lifted and lowered.

In practice, see dotted lines Fig. 1, the bars in their lowered position will clear the top of the supplementary platform 12 so that a vehicle can readily have its front wheels positioned on the supplementary platform. The first operation of the pneumatic pistons is to lift the side pieces 32 and 33 into the position shown in Fig. 1 and thereafter to lift to the requisite height the platform 12 positioned therein between the side plates 32 and 33. A frame piece 36, which may be in the form of an I-beam, extends outwardly from the central framing 27 and is braced somewhat by a rigid under member 37, Fig. 1.

An eye-bolt 38 extends through a tubular guide 39 on the end of piece 36 and is provided with a compression spring 40 held between said guide tube 39 and a nut 41 on the eye-bolt 38 by which the degree of force exercised by spring 40 may be regulated. The eye-bolt 38 is secured to a link 42 which in turn is secured to an eye-bolt 43 extending from the scale platform 10. The link 42 may, if desired, be flexible so as to permit some yielding of the impact of the piece 31 swinging in an upward direction. However, the above flexibility of connection is primarily designed to permit the entire assemblage to swing about the axis formed by trunnions 18 and 19 in a forward direction or so as to bring the supplementary platform 12 forwardly and thus compensate for the otherwise lengthening line of support of the front wheels of the vehicle on the platform 12, and the yielding spring 40 in forming part of the connection between the piece 36 and the platform 10 readily permits this.

Secured to the ends of frame members 24 and 25 are channel members 44 and 45 which extend a short distance beyond the channel 25 and are each provided with inwardly directed sets of guide pins 46 and 47 as shown in enlarged detail in Fig. 6. Hollow posts 48 and 49 are united by transverse angle iron frame pieces 50 and carry vertical angles 51 to which a sheet of metal 52 is secured. This assemblage is held so the posts 48 and 49 move between the respective sets of pins 46 and 47 carried by the two frame pieces 44 and 45, as clearly indicated in Figs. 4 and 6. The hollow posts 48 and 49 have operating therein a guide head 53, Fig. 2, connected with a rod 54 which is secured to the bottom portion of angle member 33, as clearly shown in Fig. 2, the head 53 being restrained from moving out of tubular posts 48 and 49 by means of a washer nut 55.

From the above description it will be apparent that when air is turned on from feed line 26 and the framing 31 is raised it will first lift the angle pieces 32 and 33 to the position in Fig. 1, then will lift the supplementary platform 12 and the parts carried thereby. The result of this operation will be to cause the rods 54 to be raised in the tubular members 48, 49 until the heads 53 thereon contact the cap nuts 55. After that the posts 48 and 49 will be raised carrying up with it the screen sheet 52 which will be immediately behind any horses who may have drawn the loaded wagon on the scale and who, although unhitched from the wagon, would be standing in position to be rehitched as soon as the grain has been unloaded. This will raise the screen plate 52 back of the horses and prevent any possibility of injury either to the horses or to the mechanism being hoisted, by any backing up or restlessness or kicking of the horses. Since posts 48 and 49 are rigidly connected through shaft members 54 with the angle 33 at the opposite ends thereof and the posts 48 and connecting sheet or screen 52 are held against any kind of lateral movement by means of guide pins 47 and 46 engaging posts 48 and 49, see Fig. 6, it will further be evident that the supplementary platform 12 is at all times held against any rotative movement upon the supporting piston 30.

A modified form of construction operating in a similar manner is shown in Figs. 7 to 10. In this form a pair of depending channel bars 56 and 57 are secured together at their upper ends by a transverse channel bar 58 which is fastened by bolts 59 to the supplementary platform 12. The channel bars 56, 57 and 58 have secured thereto a screen member 60 of sheet metal as indicated in full and dotted lines on Fig. 7. A second set of channels 61 and 62 are connected by a screen metallic sheet 63 and are held positioned with their webs slightly spaced from the webs of the channels 56 and 57 as indicated at 64, Fig. 10, the screen sheet 63 being slidable over the inner webs of the channels 56 and 57, as best shown in Fig. 10. The channels 61 and 62 are provided with cap pieces 65 which overlie the webs of these channels and extend opposite the outer limits of the channels 61 and 62, as clearly shown in Fig. 8. Secured to these cap pieces at the angle between their extendable portion and the sides angles 61 and 62 are supporting pieces 66 and 67. These supporting pieces take over the frame members 44 and 45 in the same manner as do the pins 47 heretofore described and hold the screen member comprising the channels 61, 62 and the screen plate 63 sustained in a definitely predetermined position when the supplementary platform 12 is in its normal unelevated position, as shown in Fig. 7.

The means for holding the back webs of the respective channels 61 and 56 and 62 and 57 spaced as indicated at 64, and yet adapted for a form of semi-telescoping movements one with respect to the other, are shown generally in Fig. 8 and in detail in Fig. 10. This comprises sets of bolts 68 each having a shouldered bearing piece 69, Fig. 10, upon which is rotatably mounted a roller 70. The bolts 68 are held rigidly secured to the channels 56 and 57 by means of nuts 71 (indicated in dotted lines in Fig. 7). The bearing portions 69 extend through slots 72 in the connecting webs of the channels 61 and 62. It follows that the base webs of channels 56 and 61, and 57 and 62 are normally held slightly spaced from one another, as indicated at 64 Figs. 9 and 10, and yet that they are freely slidable in respect to each other until the bearing portion 69 of the top bolts 68 strike the upper limits of the slots 72.

The operation then of this modification is that as the supplementary platform 12 is raised it will carry with it the guard plate 60, the rollers 70, moving up the two slots 72 between the webs of channels 61 and 62 until the bearing shanks 69 of bolts 68 engage the tops 77 of slot 72, after which the angles 61 and 62 and the connecting guard sheet 63 will be lifted with the guard sheet 60 to the limit of movement of the supplementary platform 12, being raised into position to act as a horse guard in much the same manner as in the form of my invention first described. At this time the opening left by elevation of the supplementary platform 12 will be perfectly guarded at the side toward the horses, where there are horses, and danger of accident from the movement of the horses at that point will be successfully avoided.

This arrangement also will operate to prevent any rotation of the supplementary platform 12 upon the piston support 54 in the same manner as is true of the structure of Figs. 1 to 6 inclusive.

The advantages of my invention will be apparent from the foregoing description thereof. A simple and efficient arrangment provides means for effectively and automatically elevating the front of a wagon or truck loaded with grain for the purpose of gravity dumping the grain directly upon the scale where the whole assemblage has been weighed. The arrangement provides means for guarding against backing or kicking of a team of horses which may have drawn the wagon containing the grain upon the scale platform and which have been unhitched from the wagon during the elevating operation. At the same time the supplementary platform is effectively prevented from any oscillating or tipping movements. This guarding and stabilizing construction is also operable directly in connection with a pivotal mounting of the hoisting mechanism and this pivotal mounting is a matter of very great importance, since, as has been proposed, an absolutely rigid securing of the hoisting mechanism relative to the scale platform does not allow for the necessary lengthening of the line of support of the vehicle as the front wheels thereof are raised. Another great advantage of my invention resides in the fact that the first elevating movements of the supplementary platform do not result in any raising of the horse guard which is thus limited in lifting movement to just the height necessary to prevent effective guarding and not the very great height which would result from moving the whole guard up with the platform.

The entire assemblage is easy to construct and install and the improvements herein claimed add very little to the cost of the supplementary platform and lifting mechanism therefor, and greatly facilitate and safeguard the use of such a device in connection with the weighing and dumping of grain.

I claim:

1. A grain dumping appliance adapted for use in connection with a weighing scale platform and with a supplementary platform and pneumatic means for elevating it, which comprises a pivotal support for said pneumatic hoisting means and supplementary platform, and a horse guard screen carried by said pivotal support and adapted to be elevated with the supplementary platform.

2. A grain dumping appliance adapted for use in connection with a weighing scale platform and with a supplementary platform and pneumatic means for elevating it, which comprises a pivotal support for said pneumatic hoisting means and supplementary platform, arms rigidly connected with the supplementary platform, a horse guard screen carried by the pivotal support, and means connecting said arms and horse guard screen so that after the supplementary platform has travelled up a predetermined distance the horse guard screen will be raised with it.

3. A grain dumping appliance adapted for use in connection with a weighing scale platform and with a supplementary platform and pneumatic means for elevating it, which comprises a pivotal support for said pneumatic hoisting means and supplementary platform, arms rigidly connected with the supplementary platform, a horse guard screen carried by the pivotal support, bars at the sides of said horse guard screen for supporting the same, said bars being slidably connected with said arms so that after the supplementary platform has travelled up a predetermined distance the horse guard screen will be raised with it.

4. A grain dumping appliance adapted for use in connection with a weighing scale platform and with a supplementary platform and pneumatic means for elevating it, which comprises a pivotal support for said pneumatic hoisting means and supplementary platform, arms rigidly connected with the supplementary platform, a horse guard screen carried by the pivotal support, bars at the sides of said horse guard screen for supporting the same, guides carried by the pivotal support for guiding said bars regardless of the degree of pivoting of said pivotal support, said bars being slidably connected with said arms so that after the supplementary platform has travelled up a predetermined distance the horse guard screen will be raised with it.

5. A grain dumping appliance adapted for use in connection with a weighing scale platform and with a supplementary platform and pneumatic means for elevating it, which comprises a pivotal support for said pneumatic hoisting means and supplementary platform, rod arms rigidly connected with the supplementary platform, heads on said rod arms, tubular members within which said heads are mounted to slide, caps on said tubular members engageable by said heads, and a horse guard screen supported by said tubular members, whereby after the supplementary platform has travelled up a predetermined distance the horse guard screen will be raised with it.

6. A grain dumping appliance adapted for use in connection with a weighing scale platform and with a supplementary platform and means for elevating it, which comprises a pivotal support for said pneumatic hoisting means and supplementary platform, a pair of slotted channels rigidly connected with the supplementary platform, a second pair of channels slidably connected through said slots with the first named channels, and a horse guard screen supported by said second pair of channels whereby after the supplementary platform has travelled up a predetermined distance the horse guard screen will be raised with it.

7. A grain dumping appliance adapted for use in connection with a weighing scale platform and with a supplementary platform and means for elevating it, which comprises a horse guard screen mounted for sliding movements in parallel relation to the direction of elevation of the supplementary platform, and means rigidly connected with the supplementary platform and having a telescoping sliding connection with the horse guard screen for effecting elevation of the horse guard screen after the supplementary platform has been partly elevated.

HOWARD O. WILLIAMS.